No. 742,837. PATENTED NOV. 3, 1903.
J. H. CLEVELAND.
SPEED VARYING MACHINE.
APPLICATION FILED APR. 11, 1902.
NO MODEL. 4 SHEETS—SHEET 1.

Witnesses.
Otto E. Johnson.
M. R. Sanderson.

Inventor
Jay H. Cleveland
By Clarence Chamberlain
Att'y.

No. 742,837. PATENTED NOV. 3, 1903.
J. H. CLEVELAND.
SPEED VARYING MACHINE.
APPLICATION FILED APR. 11, 1902.
NO MODEL. 4 SHEETS—SHEET 2.

No. 742,837. PATENTED NOV. 3, 1903.
J. H. CLEVELAND.
SPEED VARYING MACHINE.
APPLICATION FILED APR. 11, 1902.
NO MODEL. 4 SHEETS—SHEET 3.

Witnesses
Otto E. Johnson.
M. R. Sanderson.

Inventor
Jay H. Cleveland
By Clarence Chamberlain
Att'y.

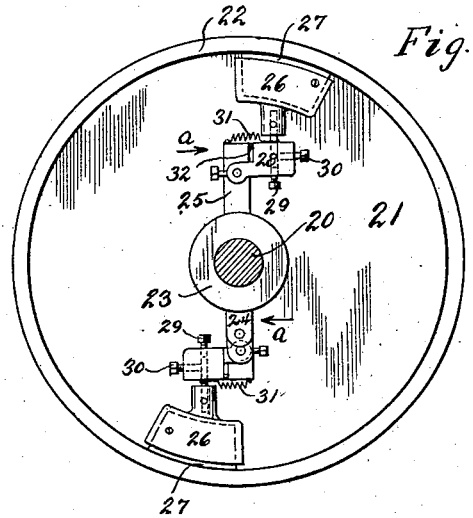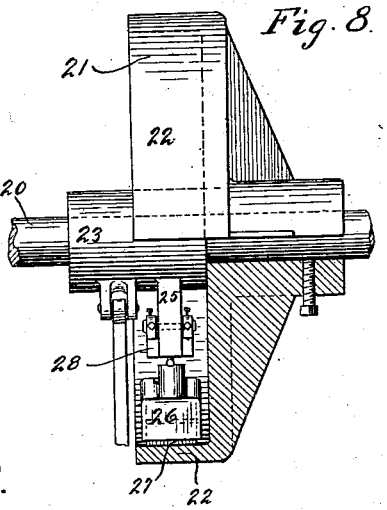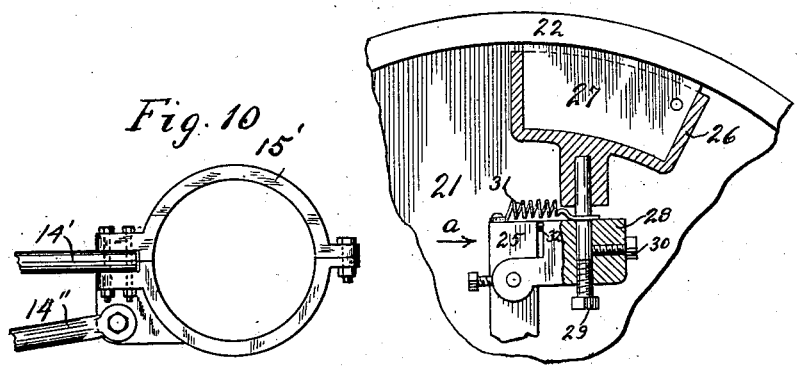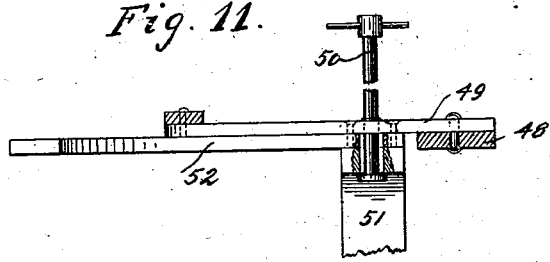

No. 742,837. Patented November 3, 1903.

UNITED STATES PATENT OFFICE.

JAY H. CLEVELAND, OF CHICAGO, ILLINOIS.

SPEED-VARYING MACHINE.

SPECIFICATION forming part of Letters Patent No. 742,837, dated November 3, 1903.

Application filed April 11, 1902. Serial No. 102,390. (No model.)

*To all whom it may concern:*

Be it known that I, JAY H. CLEVELAND, a citizen of the United States, and a resident of the city of Chicago, in the county of Cook and State of Illinois, have invented a certain new and useful Improvement in Speed-Varying Machines, of which the following is a specification.

My invention relates to mechanism for producing variable speeds for the operation of machinery; and the object thereof is to permit power to be taken from its primary source, as from a main or line shaft, and be communicated to a specific machine at such different or varying speeds as the operator may desire and with the least possible loss by friction.

The principles of my invention are illustrated in the accompanying drawings, in which—

Figure 1:
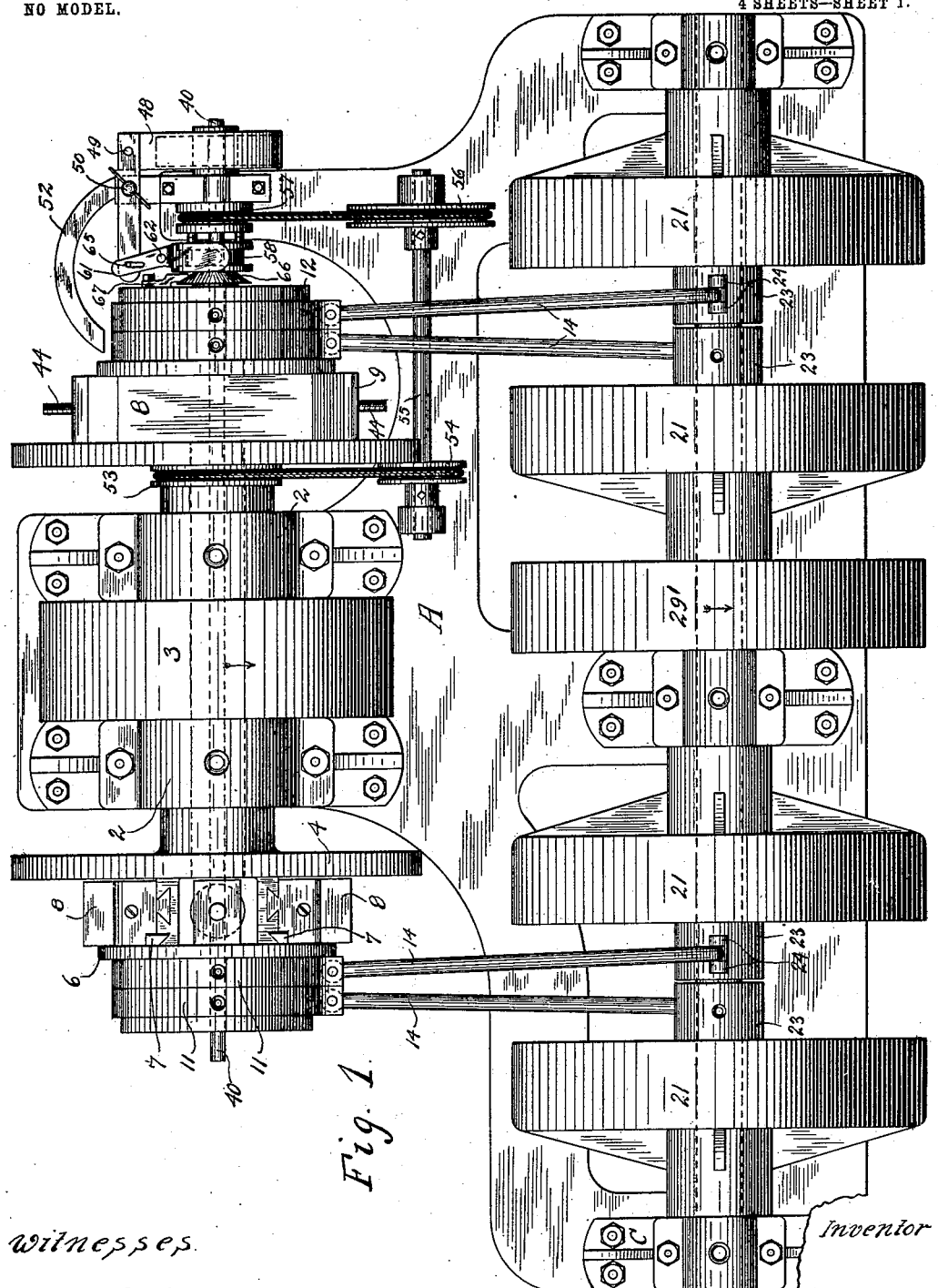
Figure 2:
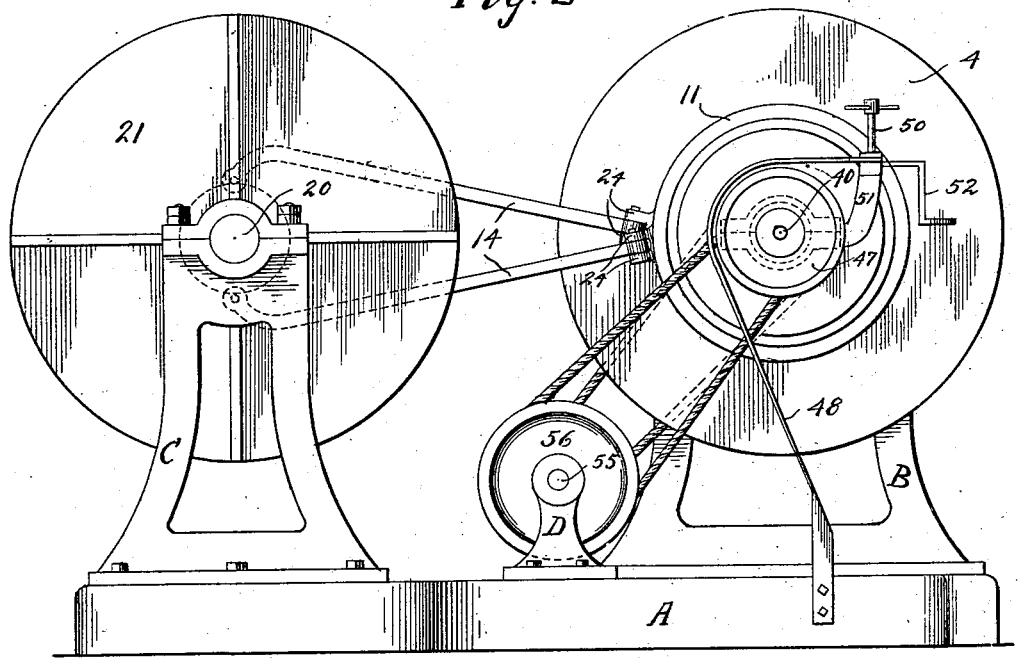
Figure 12:
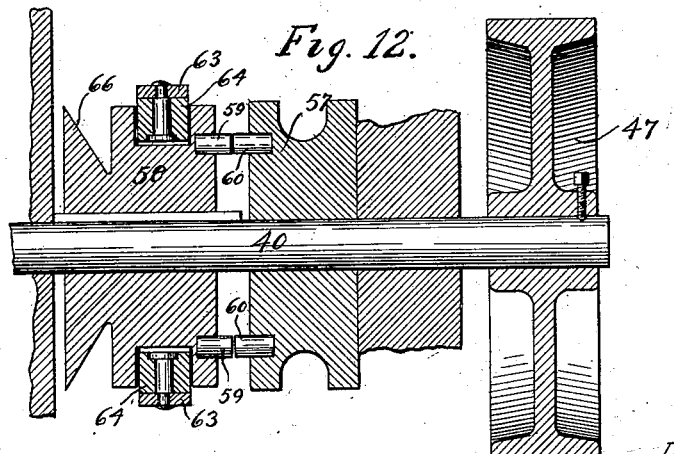
Figure 6:
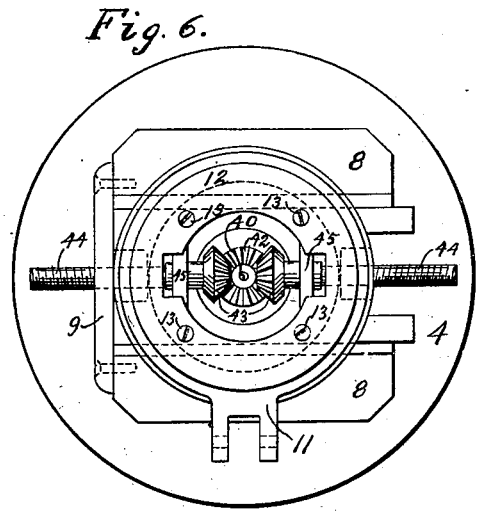
Figure 3:
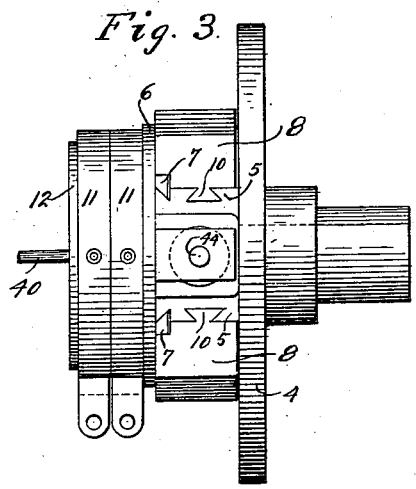
Figure 5:
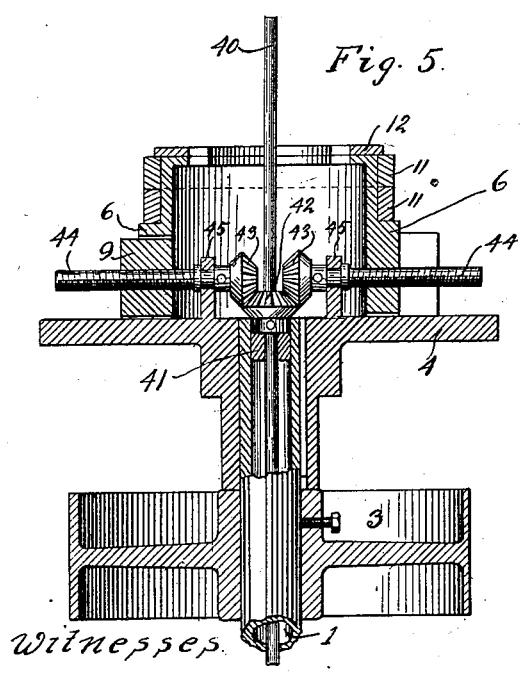
Figure 4:
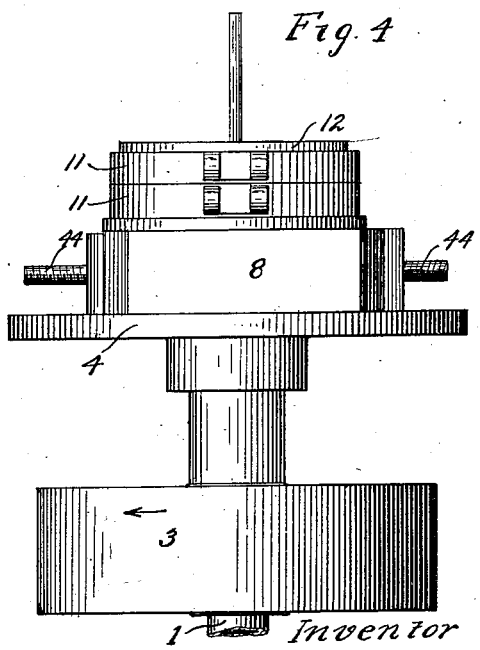

Figure 1 shows a top view of my invention. Fig. 2 is an end view of the same looked at from the right. Fig. 3 shows the eccentrics, guides, and carrying-disk illustrated in the upper left-hand portion of Fig. 1 detached therefrom. Fig. 4 is the same, together with the driving-wheel, looked at at right angles to the position shown in Fig. 3. Fig. 5 is a cross-section of Fig. 4. Fig. 6 is an end view of Fig. 3. Fig. 7 shows an appropriate form and arrangement of clutches to communicate power from the eccentrics to the secondary shaft. Fig. 8 shows the lower clutch illustrated in Fig. 7 looked at in the direction of the arrow, the disk-flange being removed to disclose the same. Fig. 9 is an enlarged detail, partly in section, of one of said clutches. Fig. 10 is an alternative construction of eccentric ring and rods in which both rods may be attached to the same eccentric-ring. Fig. 11 is an enlarged view of the gear-controlling handle and its attachments. Fig. 12 is an enlarged sectional detail of a portion of the speed-controlling mechanism illustrated in the upper right-hand corner of Fig. 1.

Describing my invention with reference to the drawings, in which like letters and characters of reference denote like parts throughout, A is a frame or foundation preferably integrally formed in such a way as to provide for attaching thereto and mounting thereon the several operative portions of my device. Such operative portions and their relations to each other may best be understood by describing the same separately. They consist of the following: first, a hollow main shaft, with driving-pulley, eccentrics, counterweights, and means for attaching the same to the main shaft; second, a secondary shaft, with clutch mechanism and the connections thereof with the eccentrics on the main shaft; third, the controlling mechanism carried on and attached to the main shaft.

Describing the above in their order with reference to the drawings, 1 is a hollow main shaft journaled at 2 upon the supports B and adapted to revolve thereon. 3 is a band wheel or pulley mounted centrally of said shaft between the bearings by which power is communicated from its original source. Two eccentrics are mounted on the extremities of the main shaft. These, with their fittings, are practically and in all essential features duplicates of each other, so that a description of one and its attaching and power-communicating parts will be a practical description of the other. A disk 4 is keyed to the hollow main shaft. Guides 5 are attached to said disks on their outer faces or formed integrally therewith. Eccentrics 6 have a dovetailed engagement 7 with said guides, and counterweights 8, attached to the cross-head 9, have a similar engagement 10 with the said guides. The arrangement of the said eccentrics and counterweights with reference to each other is such that as the former are shifted to a position concentric with the main shaft the counterweights may be correspondingly moved in the opposite direction to maintain an equilibrium on the shaft. Means for so shifting such parts is hereinafter described. Rings 11 surround the eccentrics and are held in place thereon by the face-plate 12, which is secured to the eccentrics by the screws 13. Eccentric-rods 14 are attached to the eccentric-straps and are connected at the other end to arms on the clutch-sleeve, hereinafter to be described. An alternative form, in which both eccentric-rods are attached to a single strap, is shown at 15' in Fig. 10. In this connection the rod 14' is rigidly attached to the strap and communicates the thrust of the eccentric to its attached clutch. The rod 14" is hinged to the strap to allow for variation in the movement of the clutches and communicates the pull of the eccentrics to the clutches.

The auxiliary shaft 20 is journaled to the supports C, and friction-disks 21, with projecting flanges 22 accurately machined on the inside faces, are keyed thereto. Sleeves 23, having arms 24, are fitted to the shaft, so that the latter has free movement therethrough. Rigid arms 25 are integrally formed on said sleeve, and pivoted thereto are the clutches, comprising heads 26, frictional bearing-blocks 27, and links 28. By means of the adjusting-screws 29 and set-screws 30 the faces of the clutches are made to bear lightly on the inside face of the flange 22, in which position they are held normally by the springs 31 acting against the stop 32. It will be seen that a movement of the arm 25 in the direction of the arrow $a$ will cause the frictional faces 27 to engage and bind upon the flange of the friction-disk, while a movement in the opposite direction by the dropping of the pivoted links 28 disengages the faces and permits the clutches to be drawn backward, sliding freely on the flange. While I prefer to use the construction of clutches shown, any other device or combination effecting the same result is to be considered the equivalent thereof. The free end of the eccentric-rods 14 being pivotally attached to the arms 24 establishes a connection with the mechanism of the main shaft by which the power thereof is communicated to the auxiliary shaft. A band-wheel 29' on the latter provides means by which the motion thereof may be communicated to any machine desired at a rate corresponding to the movement or throw of the eccentrics.

In the machine described the clutches under the action of each pair of eccentrics give an impulse to the secondary shaft substantially at each half-revolution of the main shaft. The pairs of eccentrics are mounted on the main shaft quartering with each other, so that the combined action of the eccentrics is to give an impulse to the secondary shaft at each quarter-revolution thereof. This will be found in most cases the most practical application of the principles of my invention; but to meet varying conditions the number of eccentrics and of the straps and rods controlled thereby may be increased or diminished at pleasure without departing from the spirit or scope thereof.

It now remains to describe the mechanism by which the movement of the eccentrics in their guides upon the main shaft and the counterweights which counterbalance them is effected. A controlling-shaft 40 extends through the main shaft 1, being journaled therein, as shown at 41 in Fig. 5. Beveled gears 42 are keyed thereon and mesh with the beveled gears 43, which are mounted upon the right and left handed screws 44, which respectively engage the counterweight cross-head 9 and the eccentric 6. The screws 44 are collared through flanges 45 on the disk 4, said flanges forming an abutment, so that when the screws are rotated the eccentrics will be moved inwardly or outwardly, according to the direction of the rotation, and a corresponding motion will be given to the counterweights.

An enlarged view of portions of the controlling mechanism is shown in Figs. 11 and 12. It provides means for turning the controlling-shaft relatively to the main shaft. As this is to be done ordinarily while the latter is in motion, slowing of the controlling-shaft causes the eccentrics to be moved in one direction, while the counterweights are moved in the other direction. To effect this, a brake-wheel 47 is secured to the shaft 40. A brake-strap 48 may be attached at one end to the base A and at the other end pivotally attached to the lever 49. Rigidly secured to this lever 49 is a handle or twister 50, which is rotatably mounted in the bracket 51. By turning said twister the lever 49, to which is pivotally secured the strap 48, is moved away from the bracket-wheel 47, and thereby draws the said strap against the brake-wheel. A stop 52 is also attached to the twister in such a manner that its free end will come in contact with the exterior face of the eccentric-rings when extended to their farthest desired point, and so limit the further application of the brake and consequent extension of the eccentrics. To effect the opposite result and the withdrawal of the eccentrics, it is necessary to speed the controlling-shaft faster than the main shaft. To do this, a pulley 53 on the main shaft is belted to a smaller pulley 54 on an auxiliary shaft 55, which is journaled in the supports D. A large pulley 56 on the other end of the shaft 55 is belted to the small loose pulley 57 on the controlling-shaft 40. The relative sizes of the pulleys 53, 54, 56, and 57 should be such that the speed of the last, whose motion is in the same direction as that of the first, is about twice as great, and sprocket-wheels and chains may be substituted for the pulleys and belts, if desired. A grooved clutch-wheel 58 is splined to the shaft 40, and projecting lugs 59 thereon are adapted to engage similar lugs 60 on the loose pulley 54. A clutch-lever 61 is pivoted at 62, and the arms 63 thereof are provided with roller-sleeves 64, which depend into the groove of the clutch-wheel 58. The single arm of said lever 61 has a slotted attachment at 65 to the lever 49, so that a side motion thereof will throw the wheel 58 in or out of clutch with the loose pulley 57. A beveled flange 66 is attached to the clutch-wheel 58, and a cam-edged lug 67 is rigidly attached to the eccentric-plate 12 in such a position that when the eccentrics are moved to a point concentric with the main shaft the lugs 59 on the clutch-wheel will be drawn out of engagement with the lugs 60 of the loose pulley 57.

The operation of my machine is as follows: Assuming the position of the several parts as shown in Fig. 1, in which the eccentrics are concentric with the main shaft, power being applied to the main shaft by the band-wheel 3, the shaft, together with the eccentrics thereon and the controlling-shaft within, will turn together without communicating motion to the secondary shaft. By turning the handle or twister 51 with a rotary motion the brake-strap 48 is applied to the brake-wheel 47, retarding its motion, so as to turn backward relatively to the motion of the revolving main shaft. The beveled gears on the controlling-shaft thus turn the pinions with which they are meshed, causing the screws 44 to be revolved to move the eccentrics from their central position and similarly to move the counterweights to balance the same, so that the shaft runs smoothly in its bearings. The motion of the eccentrics is communicated by the eccentric-rods 14 to the clutch mechanism, one of the rods attached to each pair of eccentrics causing its clutches to be engaged with the friction-disk at the same time that the clutches connected with the other rod of the said pair are disengaged. Continuous application of the brake-strap causes the eccentrics to be proportionately extended, and with the increased throw thereof the speed of the secondary shaft is proportionately increased up to the limit for which the machine is designed. When the eccentrics have been fully extended, the pair at the right hand of Fig. 1 engage the arm 52, attached to the controlling-handle, thus preventing further application of the brake, without which no further extension of the eccentrics is possible. When it is desired to slow the machine down from a higher speed, the handle 50 is given a side motion away from wheel 58, and by means of lever 49 and its slotted connection with lever 61, which is secured to said wheel by means of the arms 67, carrying roller-sleeves 64, the clutch-wheel 58 is drawn into position whereby the lugs 59 thereon engage with lugs 60 on the band-wheel 57, thus bringing into play the clutch formed of members 59 and 60. The band-wheel 57 being revolved through the medium of the auxiliary shaft 54 at a greater speed than that of the main shaft communicates its motion to the clutch, which is splined on the controlling-shaft 40, giving its motion thereto and causing the same to be rotated faster than the main shaft. Such motion reverses the previous motion of the gears and screws controlling the eccentrics and counterweights, causing them to be withdrawn until the speed is reduced to the desired point or until the eccentrics are concentric with the main shaft. As the eccentrics approach the latter position the cam-faced lug 67 engages the cam 66, thereby withdrawing the clutch 58 from its engagement with the loose pulley 57. When this is done, no further power will be communicated to the secondary shaft, and the parts will be in their original position, the main shaft, with its attachments, again running free in its bearings.

While I have herein shown and described more or less complete details of a practical and operative machine, I do not intend to limit myself to the details, form of construction, or combinations shown. These may be varied in many ways, and I contemplate changes in the form and proportion of parts, the number thereof which have similar functions or are duplicate, and the introduction of equivalents wherever expedient or necessary without departing from the spirit or scope of my invention.

I claim—

1. In a speed-varying machine, a main shaft, an eccentric thereon, a counterweight slidingly mounted on said shaft, a screw engaging said eccentric and counterweight, a pinion on said screw, a controlling-shaft mounted in said main shaft, a gear thereon meshing with said pinion, means for rotating the controlling-shaft relatively to the main shaft, a secondary shaft, and means for communicating motion from the eccentric thereto, substantially as described.

2. In a speed-varying machine, a main shaft, an eccentric and a counterweight slidingly mounted thereon, a secondary shaft, means for communicating motion from the eccentric thereto, and means for shifting the relation of the eccentric and counterweight relatively to the main shaft, and to each other, comprising screws engaging said eccentric and counterweight, pinion-heads on said screws, a controlling-shaft, a gear-wheel mounted thereon meshing with said pinions, and means for rotating said controlling-shaft relatively to the main shaft, substantially as described.

3. In a speed-varying machine, a main shaft, a controlling-shaft mounted therein, a secondary shaft, a reciprocating clutch mechanism thereon, comprising a friction-disk secured to said shaft, a sleeve thereon, a clutch on the sleeve with frictional contact to engage the disk and an arm on the sleeve attached to the eccentric, an eccentric and counterweight mounted on the main frame, screws engaging said counterweight, an eccentric mounted on said shaft, a pinion on each of said screws, a gear mounted on the controlling-shaft adapted to mesh with said pinions of the screws, and mechanism to speed said controlling-shaft, substantially as described.

4. In a speed-varying machine, a hollow main shaft, guides in the shaft, an eccentric slidably mounted in the guides, a screw mounted on the shaft and engaging the eccentric, a pinion on said screw, a controlling-shaft journaled in the main shaft, a gear thereon meshing with the pinion, means for turning the controlling-shaft relatively to the main shaft to shift the eccentric, a secondary shaft having reciprocating clutches, and an eccentric strap and rod to communicate the motion of the eccentric to the secondary shaft, substantially as set forth.

5. In a speed-varying machine, a hollow main shaft, guides on the shaft, an eccentric slidably mounted in the guides, a screw mounted on the shaft and engaging the eccentric, a pinion secured to said screw, a controlling-shaft journaled in the main shaft, a gear thereon meshing with the pinion, a brake to retard the motion of the controlling-shaft, mechanism to speed the controlling-shaft, a secondary shaft having reciprocating clutches, and an eccentric strap and rod to communicate the motion of the eccentric to the secondary shaft, substantially as set forth.

6. In a speed-varying machine, a hollow main shaft, an eccentric and counterweight slidably mounted on the shaft, screws, mounted on the shaft to engage the eccentric and the counterweight, a pinion secured to each of said screws, a controlling-shaft journaled in the main shaft, a gear thereon meshing with the pinions, means for turning the auxiliary shaft relatively to the main shaft to shift the eccentric and counterweight, a secondary shaft, and means for communicating the motion of the eccentric thereto, substantially as set forth.

7. In a speed-varying machine, a hollow main shaft, an eccentric and counterweight slidably mounted on the shaft, screws, mounted on the shaft to engage the eccentric and the counterweight, a pinion on each of said screws, a controlling-shaft journaled in the main shaft, a gear thereon meshing with the pinions, a brake to retard the motion of the controlling-shaft mechanism to speed the controlling-shaft, a secondary shaft, and means for communicating the motion of the eccentric thereto, substantially as set forth.

8. In a speed-varying machine, a main shaft, an eccentric slidably mounted on said shaft, a screw engaging said eccentric mounted on said shaft, a pinion thereon, a controlling-shaft journaled in the main shaft, a gear thereon engaging said pinion, means for retarding and speeding said controlling-shaft, a secondary shaft adapted to receive the motion from said eccentric, a disk secured on said shaft, a clutch mounted thereon adapted to engage the disk on movement in one direction and to release the same during motion in the other, substantially as described.

9. The combination with a hollow shaft, an eccentric thereon, screws mounted on the shaft to engage the eccentric, pinions secured to said screws, a controlling-shaft, a gear thereon meshing with said pinion, means for turning the controlling-shaft, and a counterweight mounted on the main shaft engaged by said screws, substantially as described.

10. In combination with a hollow shaft, an eccentric, a counterweight, screws engaging the eccentric and counterweight, pinion-heads on said screws, a controlling-shaft, a gear thereon meshing with the pinions and means for turning the controlling-shaft, substantially as set forth.

11. In a speed-varying machine, a secondary shaft, and means for rotating the same, said means including a hollow main shaft, an eccentric and a counterweight slidably mounted thereon, screws engaging the eccentric, pinions on said screws, a controlling-shaft journaled in the main shaft, a gear on the controlling-shaft meshing with the pinions, and means for turning the controlling-shaft relatively to the main shaft, substantially as set forth.

12. In a speed-varying machine, a secondary shaft and means for rotating the same, said means including a hollow main shaft, an eccentric and a counterweight mounted thereon, screws severally engaging the eccentric and counterweight, pinions on the screws, a controlling-shaft turning in the main shaft, a gear on the controlling-shaft meshing with the pinion and means for turning the controlling-shaft relatively to the main shaft, substantially as set forth.

In witness whereof I have hereunto set my hand, this 8th day of April, 1902, in the presence of two subscribing witnesses.

JAY H. CLEVELAND.

Witnesses:
C. K. CHAMBERLAIN,
ANNIE S. PHILLIPS.